Patented Dec. 6, 1938

2,139,588

UNITED STATES PATENT OFFICE 2,139,588

ESTERS OF HYDROGENATED ABIETYL ALCOHOL AND METHOD OF PRODUCING

Irvin W. Humphrey, Wilmington, Del., assignor to Hercules Powder Company, Wilmington, Del., a corporation of Delaware No Drawing. Application May 18, 1935, Serial No. 22,264

16 Claims. (Cl. 260—100)

This invention relates to esters of hydrogenated abietyl alcohol and method of producing.

The esters contemplated by this invention will be produced from fully or partially hydrogenated abietyl alcohol, as, for example, dihydro and tetrahydro abietyl alcohol or their mixtures, by reaction with an organic acid or an equivalent therefor according to the method contemplated by this invention.

More specifically in producing esters in accordance with this invention abietyl alcohol may be first hydrogenated to the desired degree and then esterified with an organic carboxylic acid or equivalent by heating with or without the use of an esterification catalyst. Or the abietyl alcohol may first be esterified with the organic acid, and the abietyl ester so formed hydrogenated to the desired degree. The hydrogenated abietyl alcohol may also be prepared directly by the hydrogenation and reduction of the abietyl group to the alcohol group of abietic acid or its esters.

In proceeding to the practical adaptation of this invention the abietyl alcohol may be produced by any suitable method, as, for example, by dissolving an ester of abietic acid, for example, ethyl or methyl abietate, in a monohydric aliphatic alcohol, for example, ethyl or butyl alcohol, heating the solution with metallic sodium, diluting the solution with water, distilling off the low boiling alcohol, and finally extracting the abietyl alcohol formed by means of a water-immiscible solvent, as benzene, which is substantially the method of Ruzicka (Helv. Ch. Acta 5—588); by using the hydrogenated ester, as hydrogenated ethyl abietate, instead of the non-hydrogenated ester, hydrogenated abietyl alcohol results. Hydrogenation of the abietyl alcohol so produced may be accomplished by any of the well known methods for the hydrogenation of unsaturated compounds.

Hydrogenated abietyl alcohol may also be obtained by reducing the carboxyl group of rosin or rosin esters of hydrogenated abietic acid to a primary alcohol group by treatment of hydrogenated abietic acid, or rosin, or an ester of hydrogenated or non-hydrogenated abietic acid with hydrogen under pressure of say about 70–1000 atmospheres at an elevated temperature of say about 225–350° C., in the presence of a catalyst, such as, for example, copper chromite, zinc chromite, etc., all as is more fully disclosed in my application for United States Letters Patent, Serial Number 604,859, filed April 12, 1932, of which this application is a continuation in part. The hydrogenated abietyl alcohol so produced will consist of dihydro- or tetrahydroabietyl alcohol or a mixture thereof depending upon the exact conditions of temperature and pressure employed in the production steps. If the alcohol is derived from rosin, rather than from pure abietic acid, it may contain hydrogenated resin alcohols other than hydrogenated abietyl alcohol, as, for example, hydrogenated pimarol.

Thus, for example, a rosin ester, as ethyl abietate, in solution in ethyl alcohol is heated with metallic sodium and the abietyl alcohol formed is recovered. The abietyl alcohol is then treated with hydrogen at elevated temperature and pressure in the presence of a base metal hydrogenation catalyst as nickel, cobalt, copper chromite, etc., or at lower temperatures in the presence of a noble metal catalyst as platinum, palladium, etc. For example, the abietyl alcohol may be hydrogenated by treatment with hydrogen at a temperature of 125–225° C., and under a hydrogen pressure of about 20–400 atmospheres, in the presence of a nickel hydrogenation catalyst. Such procedure, depending on the hydrogen pressure used, will result in the production of dihydroabietyl alcohol or of a mixture of dihydro- and tetrahydro-abietyl alcohol by addition of hydrogen to the unsaturated bonds of the abietyl alcohol. The proportion of tetrahydro-abietyl alcohol will be increased with increase of the pressure used above about 100 atmospheres.

Alternatively, for example, the hydrogenated abietyl alcohol may be produced by reducing the ester group of, for example, hydrogenated ethyl, butyl or methyl abietate to the alcohol group with hydrogen, at a temperature of about 225–326° C., under pressure of 80–1000 atmospheres and in the presence of a conversion catalyst such as copper-chromite, zinc chromite, etc. If desired hydrogenated rosin, dihydroabietic acid, tetrahydroabietic acid, or their mixtures, may be converted into dihydro- or tetrahydro-abietyl alchol or mixtures thereof similarly. The rosin ester, rosin, or abietic acid may be first hydrogenated by contacting with a base metal hydrogenation catalyst as nickel, copper-chromite, cobalt, etc., at a temperature of about 125° C.–225° C. and under about 20–500 atmospheres hydrogen pressure, yielding dihydro-products at lower pressures and mixtures of dihydro- and tetra-hydro-abietate esters or of dihydro- and tetrahydro-abietic acid at higher pressures, the chromite catalyst giving only the dihydro compound.

The esters contemplated by this invention may be formed by reacting partially or fully hydrogenated abietyl alcohol with an organic acid, or equivalently with an organic carboxylic anhydride, or certain organic acid compounds, as organic acid chlorides, organic acid esters, etc. The organic acid or equivalent may be aromatic, hydroaromatic, carboxylic, heterocyclic, or aliphatic, and may be monobasic or polybasic. As illustrative, the organic acid or equivalent may, for example, be acetic, butyric, propionic, valeric, furoic, benzoic, cinnamic, salicylic, lactic, oleic, palmitic, stearic, lauric, linoleic, linolenic, itaconic, abietic, dihydroabietic, tetrahydroabietic, pimaric, ricinoleic, dihydroxy stearic, glycollic, crotonic, formic, hydrofuroic, naphthenic, anisic, capric, tetrahydrofuroic acid, caprylic, cerotic, pyruvic, naphthoic, sorbic, hydrosorbic, carnaubic, acrylic, mellissic, margaric, toluic, erucic, levulinic, myristic, nonoic, sativic, alpha or beta-elaeostearic, etc., or mixtures thereof; adipic, citric, citraconic, maleic, malic, tartaric, sebacic, pimelic, succinic, terephthalic, phthalic, malonic, oxalic, glutaric, suberic, camphoronic, methyl succinic, hydropimaric, azelaic, aconitic, tricarballylic, diphenic, fumaric, naphthalic, acids present in copal and kauri, and pyromellitic, etc., or mixtures thereof. Substituted organic acids as monochlor acetic, dichlor acetic, nitrobenzoic, etc., may be used. Likewise, the acidic groups in acid esters as mono-methyl succinate, alpha-terpinene monobutyl-maleate, the monoethyl maleate of methyl abietate, the dimethyl maleate of abietic acid, the monomethyl ester of alpha-pinene-maleic anhydride, mono-ethyl phthalate, etc., or acid esters of any of the polybasic acids mentioned above, may be esterified with hydrogenated abietyl alcohol. As indicated, organic anhydrides, as acetic, phthalic, maleic, succinic, etc. anhydrides, or addition products of maleic anhydride to unsaturated compounds, as terpinene-maleic anhydride, dipentene-maleic anhydride, abietic acid-maleic anhydride, abietyl-alcohol-maleic anhydride, butadiene-maleic anhydride, pinene-maleic anhydride, terpinolene-maleic acid, polymerized terpenes or rosin oil, which have been combined with maleic anhydride, rosin-maleic anhydride, various rosin esters which have been condensed with maleic anhydride as the abietates of methyl, ethyl, propyl, butyl alcohols, glycerol, ethylene glycol, diethylene glycol, etc., may be used. The acid esters, if obtained, may be further esterified by heating with an alcohol as methyl, ethyl, propyl, butyl, amyl, benzyl, cyclohexanol, fenchyl, bornyl, lauryl, glycerol, stearyl, cetyl, palmitol, or a glycol as ethylene glycol, propylene glycol, diethylene glycol, butylene gycol, triethylene glycol, ethylene glycol monoabietate, propylene glycol monoacetate, ethylene glycol monobutyl ether, etc.

Since hydrogenated abietyl alcohol is a high boiling primary alcohol, the esters may generally be produced without the use of a catalyst, especially when the organic acid is also comparably non-volatile, as is the case, for example, with abietic, hydrogenated abietic, succinic, stearic, palmitic, hydrogenated pimaric acids, hydrogenated rosin, other resin acids, either hydrogenated or non-hydrogenated, etc. However, it is frequently desirable to employ a catalyst and when such is used, for example, 1-3% by weight of dry hydrogen chloride or concentrated hydrochloric acid, less than 1% of concentrated sulphuric acid, anhydrous zinc chloride, small amounts of phosphoric acid, or a small percentage of paratoluene sulphonic acid, benzene sulphonic acid, acid sodium sulphate, boric anhydride, etc., or mixtures thereof will be found satisfactory in certain instances.

If desired in carrying out the method contemplated a relatively low boiling water-immiscible solvent for the ester product, as benzene, toluene, carbon tetrachloride, etc., may be used to assist in the removal of the water of reaction.

In the practical adaptation of the method embodying this invention for production of the esters contemplated, generally speaking the hydrogenated abietyl alcohol, as dihydro or tetrahydro abietyl alcohol, or a mixture thereof, will be reacted by heating with an organic carboxylic acid, or equivalently an organic anhydride, or acid compound of an organic acid, as an acid ester, with or without the use of a catalyst and/or a low boiling water-immiscible solvent to facilitate the removal of water of reaction. On completion of the reaction, if an excess of organic acid was used, or if the ester product be too acid, it may be dissolved in a suitable water-immiscible solvent, as benzene, toluene, etc., and the solution washed with aqueous alkali, to remove excess acid with finally evaporation of the solvent.

If a volatile organic acid, such as, for example, acetic acid, etc., be used the esterification may be carried out by passing an excess of the volatile acid into the heated hydrogenated abietyl alcohol. The excess acid may be removed along with the water of reaction by distillation.

In proceeding, the reaction may be carried out at any operable temperature and pressure. Any temperature, including in a few instances room temperature, which will not decompose the reagents or the product, under the pressure conditions prevailing and at which the reaction will proceed, in other words, various reaction temperatures may be used. Generally speaking, the reaction will proceed desirably at temperatures say within about the range 100° C. to 300° C., and generally fairly rapidly at 175° C.–225° C., under atmospheric pressure, while, desirably, permitting the water produced in the reaction to escape. The reaction will generally be completed, when using the temperature indicated, within about 2–15 hours, depending upon the temperature, catalyst used, if any, reactivity of the acid, and proportion of reagents.

The reagents may be heated in any desired proportion, but usually it will be found efficient to react the hydrogenated abietyl alcohol and an organic acid or equivalent in about the desired chemically equivalent reacting proportions to form chiefly either neutral or acid esters from polybasic acids. Higher temperatures will usually be employed for the formation of the neutral esters from polybasic acids than for the formation of the acid esters, for example, 175° C.–275° C. for the former and 125° C.–200° C. for the latter. The acid esters may be further esterified with another alcohol, as above mentioned, or such other alcohol may be included in the reaction mixture for the formation of a mixed ester. In event the organic acid is relatively volatile a considerable excess of the acid may be employed in the esterification, subsequently removing the excess by distillation under reduced pressure or by water washing if water-soluble, etc.

As specifically illustrative of the practical adaptation of the method in accordance with this invention for the production of the product contemplated, for example, 9 parts by weight of hydrogenated abietyl alcohol, say comprising a mixture of dihydro and tetrahydro abietyl alcohol, is heated at about 200° C., for about 8 hours with 1.8 parts of succinic acid, using an air condenser to permit the removal of water of reaction. The hydrogenated abietyl alcohol will be converted into an ester of low acidity.

As a further illustration, 21 parts of hydrogenated abietyl alcohol is allowed to react with 80 parts of acetic anhydride, containing 4 parts of sulphuric acid as a catalyst, at room temperature, for three days. The resultant ester will show only a few percent of unreacted alcohol.

As a further illustration, 10 parts of hydrogenated abietyl alcohol are heated with 10 parts of hydrogenated rosin for 5 hours at 250° C.–260° C., and then for 5 more hours at 260° C.–280° C. The resultant ester is a hydrogenated abietyl hydroabietate.

As a further illustration, for example, 415 parts of the condensate of methyl abietate with maleic anhydride are heated with 600 parts of hydrogenated abietyl alcohol at 200° C.–250° C. for 8 hours yielding a product consisting largely of the neutral ester. Similarly 230 parts of the condensate of maleic anhydride with terpinene or pinene may replace the 415 parts of methyl abietate-maleic anhydride.

The esters in accordance with this invention are usually amorphous compounds. Sometimes they are very viscous liquids but are more generally solids with melting points varying from about 50° C. to 100° C. (drop method). When conditions are such as to effect a high degree of esterification, the acid number varies from 5 to 25. They are in general more readily saponified than esters of abietic acid. Esters of hydrogenated abietyl alcohol are more resistant to discoloration on aging than esters of non-hydrogenated abietyl alcohol. They have thiocyanate values of from 0 to about 40 depending upon the degree of hydrogenation of the unsaturated bonds of the abietyl alcohol, and exhibit much lower iodin values than those of the corresponding non-hydrogenated abietyl esters. Their properties also depend upon the purity of the hydrogenated abietyl alcohol used. High hydrogenated abietyl alcohol is preferred to that of a low degree of saturation.

The products in accordance with this invention will be found variously adaptable for use in the commercial arts as, for example, ingredients in coating compositions, as lacquer, varnishes, synthetic resins, etc., or in plastic compositions. The products in accordance with this invention may be advantageously used in such compositions to replace in whole or in part other resins heretofore used for such purposes.

This application is filed as a continuation in part of application Serial No. 687,481, filed August 30, 1933, which was filed as a continuation in part of an application for United States patent for Method of producing hydrogenated abietyl alcohol and product, Serial No. 604,859, filed April 12, 1932.

What I claim and desire to protect by Letters Patent is:

1. A reaction product of hydrogenated abietyl alcohol and maleic acid.

2. A reaction product of hydrogenated abietyl alcohol with an active carboxyl group of an acidic compound derived by condensing maleic anhydride with a terpene compound containing reactive unsaturated double bonds.

3. A reaction product of hydrogenated abietyl alcohol with an active carboxyl group of an acidic compound derived by condensing maleic anhydride with a rosin compound containing reactive unsaturated double bonds.

4. The method of producing an ester of hydrogenated abietyl alcohol, which includes reacting a carboxyl group of maleic acid with a hydroxyl group of the alcohol.

5. The method of producing an ester of hydrogenated abietyl alcohol, which includes reacting maleic acid with the alcohol.

6. The method of producing an ester of hydrogenated abietyl alcohol which includes reacting a carboxyl group of maleic acid with a hydroxyl group of the alcohol in the presence of an esterification catalyst.

7. The method of producing an ester of hydrogenated abietyl alcohol which includes reacting a carboxyl group of maleic acid with a hydroxyl group of the alcohol in the presence of heat.

8. The method of producing an ester of hydrogenated abietyl alcohol which includes reacting a carboxyl group of maleic acid with a hydroxyl group of the alcohol at a temperature of about 100° C. to about 300° C.

9. An ester formed by the reaction of a hydroxyl group of hydrogenated abietyl alcohol with a carboxyl group of maleic acid.

10. The method of producing an ester which includes reacting a hydrogenated abietyl alcohol with a carboxyl group of a compound selected from the group consisting of maleic acid, maleic anhydride, maleic anhydride-terpene addition product, maleic anhydride-rosin compound addition product and maleic anhydride-butadiene addition product.

11. A reaction product of hydrogenated abietyl alcohol with a carboxyl group of a compound selected from the group consisting of maleic acid, maleic anhydride, maleic anhydride-terpene addition product, maleic anhydride-rosin compound addition product and maleic anhydride-butadiene addition product.

12. The method of producing an ester of a hydrogenated abietyl alcohol which includes reacting a maleic anhydride-terpene compound addition product with the alcohol.

13. The method of producing an ester of a hydrogenated abietyl alcohol which includes reacting a maleic anhydride-terpene compound addition product with the alcohol in the presence of an esterification catalyst.

14. The method of producing an ester of a hydrogenated abietyl alcohol which includes reacting a maleic anhydride-terpene compound addition product with the alcohol in the presence of heat.

15. The method of producing an ester of a hydrogenated abietyl alcohol which includes reacting a maleic anhydride-terpene compound addition product with the alcohol at a temperature between about 100° C. and about 300° C.

16. The method of producing an ester of a hydrogenated abietyl alcohol which includes reacting a maleic anhydride-rosin compound addition product with the alcohol.

IRVIN W. HUMPHREY.